(12) United States Patent
Fields et al.

(10) Patent No.: US 10,601,778 B2
(45) Date of Patent: Mar. 24, 2020

(54) VISUALIZATION OF TRAFFIC FLOWING THROUGH A HOST

(71) Applicant: Arbor Networks, Inc., Burlington, MA (US)

(72) Inventors: Joshua M. Fields, Ypsilanti, MI (US); Christopher C. Cassell, Ann Arbor, MI (US); Jeffrey Doppke, Canton, MI (US)

(73) Assignee: Arbor Networks, Inc., Westford, MA (US)

( * ) Notice: Subject to any disclaimer, the term of this patent is extended or adjusted under 35 U.S.C. 154(b) by 78 days.

(21) Appl. No.: 15/266,785

(22) Filed: Sep. 15, 2016

(65) Prior Publication Data
US 2018/0077119 A1    Mar. 15, 2018

(51) Int. Cl.
  *H04L 29/06* (2006.01)
  *H04L 12/26* (2006.01)
  *G06T 11/20* (2006.01)

(52) U.S. Cl.
  CPC ........ *H04L 63/0263* (2013.01); *G06T 11/206* (2013.01); *H04L 43/045* (2013.01); *H04L 43/065* (2013.01); *H04L 43/0876* (2013.01); *H04L 63/1458* (2013.01); *H04L 2463/143* (2013.01)

(58) Field of Classification Search
  CPC .. H04L 63/0263; H04L 63/1458; H04L 41/22
  See application file for complete search history.

(56) References Cited

U.S. PATENT DOCUMENTS 6,704,874 B1 * 3/2004 Porras ................... H04L 41/142
709/224
9,516,053 B1 * 12/2016 Muddu ............... H04L 63/1425
(Continued)

OTHER PUBLICATIONS

Fortinet, FortiDDoS Web-based Manager v3.2 Reference Guide, Mar. 27, 2013, Fortinet, Inc. (Year: 2013).*
(Continued)

*Primary Examiner* — Carl G Colin
*Assistant Examiner* — Vance M Little
(74) *Attorney, Agent, or Firm* — Locke Lord LLP; Scott D. Wofsy; Christopher J. Capelli

(57) ABSTRACT

A system, method and computer readable storage medium that analyzes network traffic intercepts data communications occurring between one or more hosts and a preselected target host in a protected network. The intercepted data communication includes a plurality of data packets. The intercepted data communications are analyzed to determine volumetric incoming and outgoing traffic flows for the received data packets. The determined volumetric incoming traffic flow for the received packets is graphically represented by a first region. The determined volumetric outgoing traffic flow for the received packets is graphically represented by a second region. The graphical representation includes a plurality of nodes interconnected by a plurality of links. The plurality of nodes represents the hosts. The plurality of links indicate operational relationship between the preselected target host, the one or more hosts, communication ports and communication services used in the data communications.

18 Claims, 6 Drawing Sheets

(56) References Cited

U.S. PATENT DOCUMENTS

| | | | | |
|---|---|---|---|---|
| 2002/0032717 | A1* | 3/2002 | Malan | H04L 41/12 |
| | | | | 718/105 |
| 2005/0289148 | A1* | 12/2005 | Dorner | G06F 21/52 |
| 2006/0095563 | A1* | 5/2006 | Benjamin | H04L 41/22 |
| | | | | 709/224 |
| 2006/0181531 | A1* | 8/2006 | Goldschmidt | H04L 41/0253 |
| | | | | 345/440 |
| 2007/0140131 | A1* | 6/2007 | Malloy | H04L 43/026 |
| | | | | 370/241 |
| 2007/0209075 | A1* | 9/2007 | Coffman | H04L 63/14 |
| | | | | 726/23 |
| 2008/0037432 | A1* | 2/2008 | Cohen | H04L 41/142 |
| | | | | 370/241 |
| 2009/0327903 | A1* | 12/2009 | Smith | H04L 41/12 |
| | | | | 715/737 |
| 2016/0164905 | A1* | 6/2016 | Pinney Wood | G06F 17/30958 |
| | | | | 726/25 |
| 2016/0173446 | A1* | 6/2016 | Nantel | H04L 63/1425 |
| | | | | 726/11 |

OTHER PUBLICATIONS

Phan, Doantam, Ling Xiao, Ron Yeh, Pat Hanrahan, and Terry Winograd. (n.d.). "Flow Map Layout." Stanford University. Retrieved from http://graphics.stanford.edu/papers/flow_map_layout/flow_map_layout.pdf (Mar. 21, 2014). (Year: 2014).*

* cited by examiner

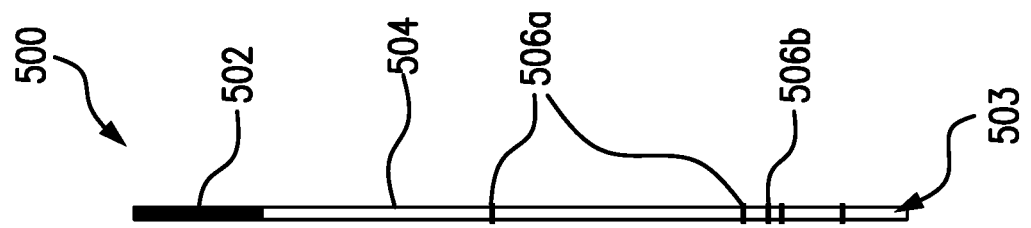
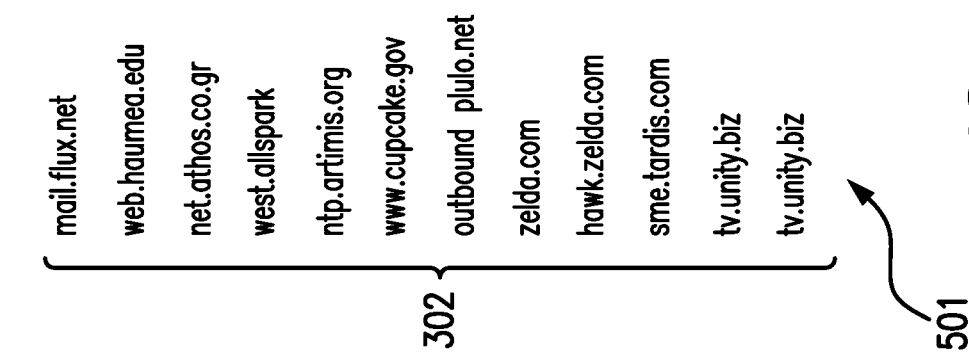
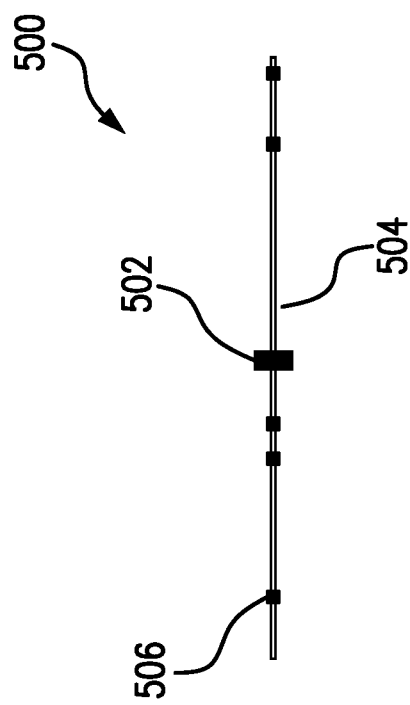
FIG. 5A
FIG. 5B

VISUALIZATION OF TRAFFIC FLOWING THROUGH A HOST

FIELD OF THE INVENTION

The present invention relates generally to computer networks, and m specifically to visualization of traffic flowing through a host.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

Networks that communicate using the Internet Protocol (IP) are an effective and flexible mechanism for enabling a wide variety of applications. However different applications frequently exhibit very different performance and capacity capabilities and place different loads on the underlying IP network. In addition, users place performance requirements (e.g., throughput and responsiveness) on these applications that challenge the queuing and routing techniques employed by IP networks to manage the flow of application traffic.

Current network management tools cannot provide effective techniques for the monitoring and analysis of suspicious traffic across IP networks. Existing techniques focus on individual hosts. These techniques are typically too low-level to provide network management staff with an effective understanding of how hosts ports/services are related to each other. This is because the traffic for a single application can contain numerous distinct IP flows and even larger numbers of IP packets. Current tools present unusual volumes of traffic as separate lists, but they paint an incomplete picture.

What is needed is a technique for monitoring and analyzing packet traffic on IP networks to provide a better understanding of the nature of traffic flowing in and out of the network being monitored.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

To achieve these and other advantages and in accordance with the purpose of the invention, as embodied, the invention includes, a system, method and computer readable storage medium in which an aspect of the invention includes intercepting data communications occuring between one or more hosts and a preselected target host in a protected network. The intercepted data communication includes a plurality of data packets. The intercepted data communications are analyzed to determine volumetric incoming and outgoing traffic flows for the received data packets. The determined volumetric incoming traffic flow for the received packets is graphically represented by a first region. The determined volumetric outgoing traffic flow for the received packets is graphically represented by a second region. The graphical representation includes a plurality of nodes interconnected by a plurality of links. The plurality of nodes represents the hosts. The plurality of links indicate operational relationship between the preselected target host, the one or more hosts, communication ports and communication services used in the data communications.

BRIEF DESCRIPTION OF THE DRAWINGS

The accompanying appendices and/or drawings illustrate various non-limiting, example, inventive aspects in accordance with the present disclosure:

FIGS. 4A-4C and 5A-5B illustrate various computer display screens generated by an embodiment of the present invention.

DETAILED DESCRIPTION OF CERTAIN EMBODIMENTS

Figure 1:
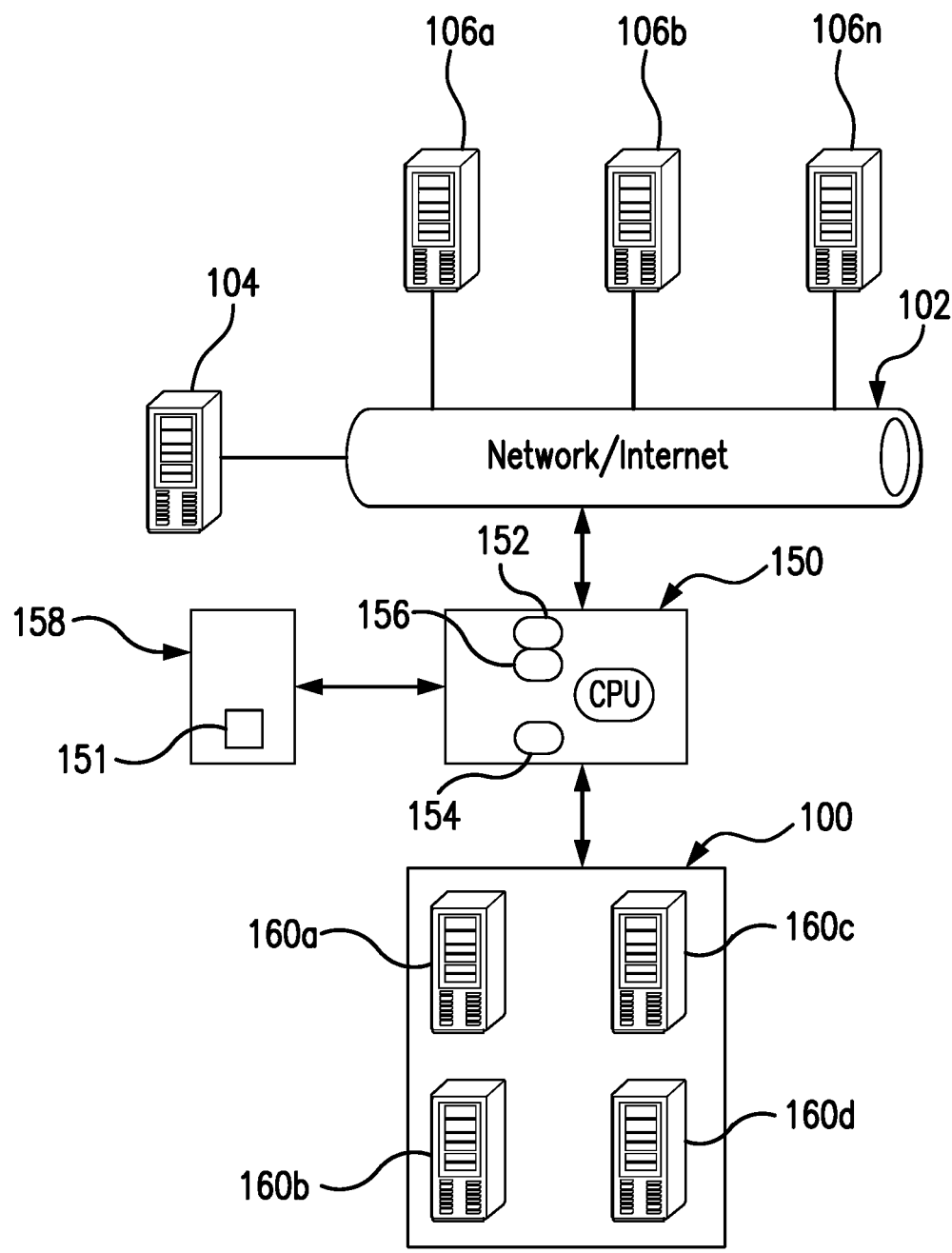
FIG. 1 illustrates an exemplary network communications system, in which an embodiment of the present invention may be implemented.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

The present embodiments relate to a method, apparatus and system to help network security analysts identify and defend against malicious network attacks. The present method collects relevant data from various network perspectives and stores the data in a central repository. Network perspectives may comprise different endpoints or middlepoints within a computer network. The collected data may be analyzed to better understand network traffic behavior and/or proactively identify potential malicious behavior.

Turning now descriptively to the drawings, in which similar reference characters denote similar elements throughout the several views, FIG. 1 illustrates the relationship between the protected network 100, protection system 150, Internet 102, and external host devices 106a-106n. It is to be appreciated that protected network 100 preferably includes a plurality of servers 160a-160n preferably consisting of a plurality of server types, including, but not limited to: Generic; Web; DNS; Mail; VOiP; VPN; RLogin; and File Servers.

In a typical implementation, the external host devices 106a-106n (also referred to as external devices or host devices) attempt to connect to protected devices 160a-160n within the protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by a protection system 150 preferably located between the Internet 102 and the protected network 100. Usually, the protected network 100 is an enterprise network, such as a school network, business network, and government network, to list a few examples.

In other embodiments, the protection system 150 is located within the Internet, service provider network or enterprise network rather than as a network edge as illustrated. It is to be appreciated that when deployed within the protected network, traffic is diverted to the protection system 150.

The protection system 150 preferably includes a packet processing system preferably having an external high speed network interface 152 and a protected high-speed network interface 154. Typically, these interfaces are capable of handling 1.5-40 Gbps, for example. System 150 may further include processing modules, such as traffic analyzer 156 that preferably process the packets received at interfaces 152 and 154. Additionally, a central processing unit (CPU), random access memory (RAM), and a storage medium 158 are preferably connected through buses and are used to further support the processing of the received packets. Computer code is preferably stored in the storage medium and executed by the CPU. In one illustrated embodiment, the storage medium 158 may preferably include content-addressable memory (CAM), which is memory designed for use in very high speed searching applications. It is noted CAM memory operates different from the more commonly used random access memory (RAM). With RAM memory a memory address is specified and the data stored at that address is returned. With CAM memory, the entire memory is searched to see if specified data are stored anywhere in the memory. The storage medium 158 also preferably stores the host tables 151 as well as other possible information such as predefined filter rules and other analyzing criteria.

In a typical implementation, the protection system 150 authenticates all external host devices 106a-106n before allowing the external devices to access the protected devices 160a-160n within the protected network 100.

During an attack, the protection system 150 seeks to distinguish between attack traffic 104 and traffic made by legitimate host devices 106a-106n by analyzing external as well as internal traffic to determine traffic flows corresponding to each protected host (device) 160a-160n, which are subsequently used by network security analysts to determine countermeasures (preferably of varying severity to mitigate a potential attack). In some embodiments, the determination of a potential attack may be based not only on an amount of suspicious activity but also based on a time span over which the suspicious actions occur. In some embodiments, the traffic analyzer 156 may identify characteristics (e.g., IP address, network domain, operating system, location, etc.) associated with the suspicious activity and present this information to users/analysts in graphical format thus helping the analysts to distinguish between activity associated with innocent users and activity associated with an attacker.

Figure 2:
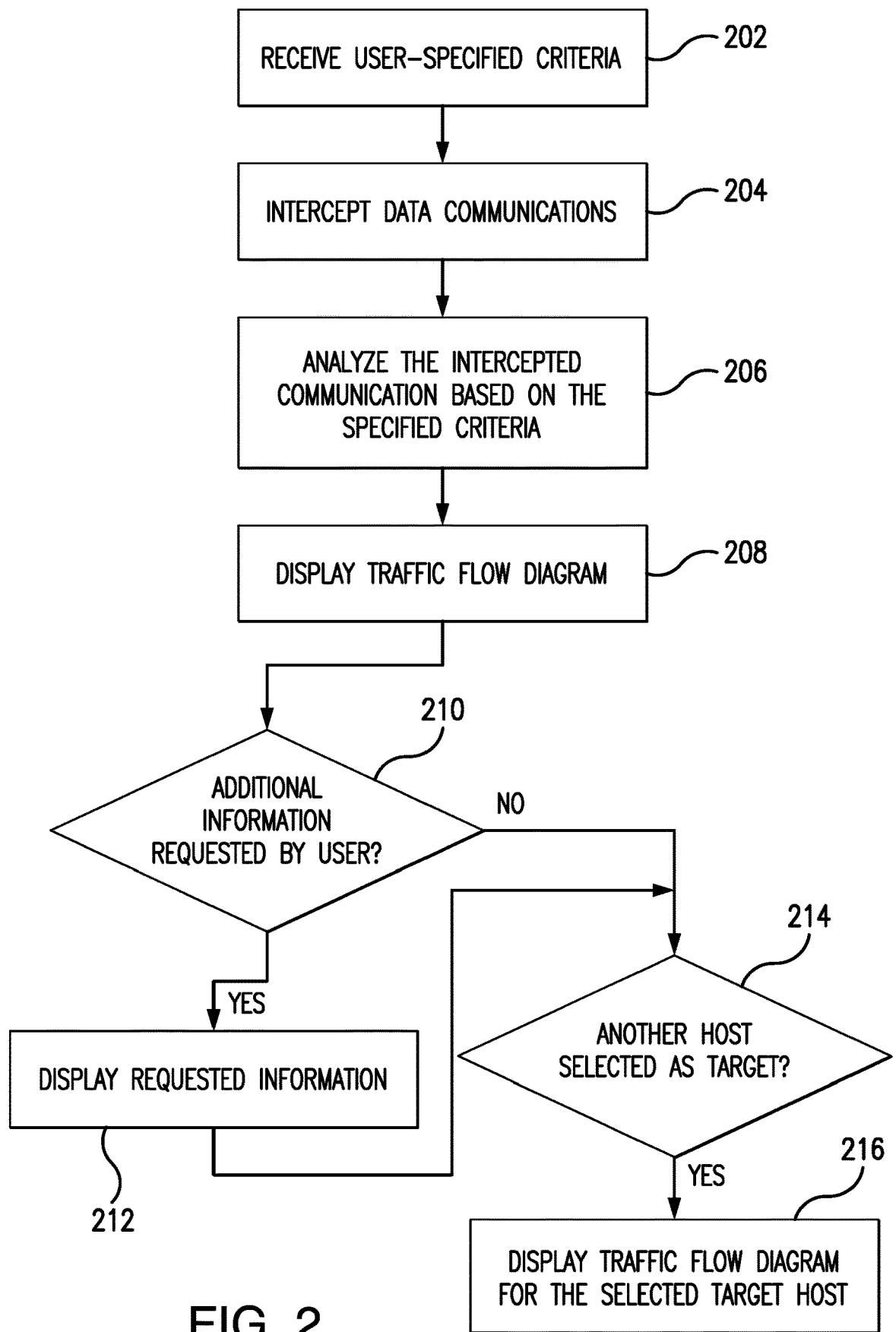
FIG. 2 is a flowchart of operational steps performed for presenting graphical visualization of traffic flowing through a host, in accordance with an illustrative embodiment of the present invention.

FIG. 2 is a flowchart of operational steps performed by traffic analyzer 156 for presenting graphical visualization of traffic flowing through a host, in accordance with an illustrative embodiment of the present invention. Before turning to descriptions of FIG. 2, it is noted that the flow diagram shown therein is described, by way of example, with reference to components shown in FIG. 1, although these operational steps may be carried out in any system and are not limited to the scenario shown in the aforementioned figures. Additionally, the flow diagram in FIG. 2 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

It should be noted that throughout this description, in one embodiment, the protection system 150 may be standalone and may receive data from log files (e.g., security logs) associated with nodes in a computer network (e.g., computers, routers, switches etc.), auditing events collected via nodes associated with the computer network, stored traffic uploaded from files and sniffing real-time network traffic that flows in the computer network. Furthermore, the protection system 150 may be implemented as a gateway/proxy server filtering network traffic according to its decisions.

With reference now to the method for presenting graphical visualization of traffic flowing through a host in accordance with the illustrated embodiment of FIG. 2, and in conjunction with computer display screen shots preferably generated by the CPU of protection system 150, and starting at step 202 (FIG. 2), traffic analyzer 156 permits the protection system user (i.e., network security analyst) to customize preferences or network traffic analysis/classification criteria. For example, the traffic analyzer 156 may permit the user to select a target host (i.e., server 160a) or a group of hosts aggregated based on a user-specified or a pre-defined system aggregation criterion (via customary computer input devices, e.g., a mouse, keyboard, stylus device, etc.) to which the below described investigative actions are to be applicable thereto. As mentioned above, the server types include, but are not limited to: Generic; Web; DNS; Mail; VOiP; VPN; RLogin; and File Servers. As another example, the traffic analyzer 156 may enable users to prescribe a length of time (i.e., one hour, two minutes, etc.) for which the protection system 150 is to capture packet data flow traffic. All such customization information may be stored on the storage medium 158 in association with a user id.

At 204, one of the components of the protection system 150 may intercept all network data communication from the target node 160a on the protected network 100 that either received or sent the network data. The intercepted data communication preferably includes a plurality of data packets. In one embodiment, when network data is intercepted, the network data is still received by the intended recipient. In some embodiments, the associated network data may be intercepted when network data is flagged as suspicious.

Once data packet flow traffic is available and captured by protection system 150, at 206, the traffic analyzer 156 is configured and operational to analyze the captured data based on the criteria specified at step 202. In other words, at 206, network data flows of interest may be discovered, captured, analyzed, and located by way of an automated operation that is based on user-specified traffic analysis criteria. For instance, the traffic analyzer 156 may determine incoming traffic flow and outgoing traffic flow associated with the target node 160a. Because of the potentially very large number of hosts communicating with the target node 160a and because the number of service instances on a host is unknown but potentially large, the traffic analyzer 156 may employ one or more traffic filtering, sorting and/or grouping mechanisms. For example, the traffic analyzer 156 may include filtering logic that filters all traffic that is sent by the external host devices 106a-106n to the target node 160a according to pre-defined sorting criteria stored in the storage medium 158. In addition, in some implementations, the traffic analyzer 156 can also filter traffic in the opposite direction, that is, from the target node 160a to the external host devices 106a-106n, or internal traffic within the protected network 100, i.e. traffic between protected hosts 160a-160n.

Figure 3:
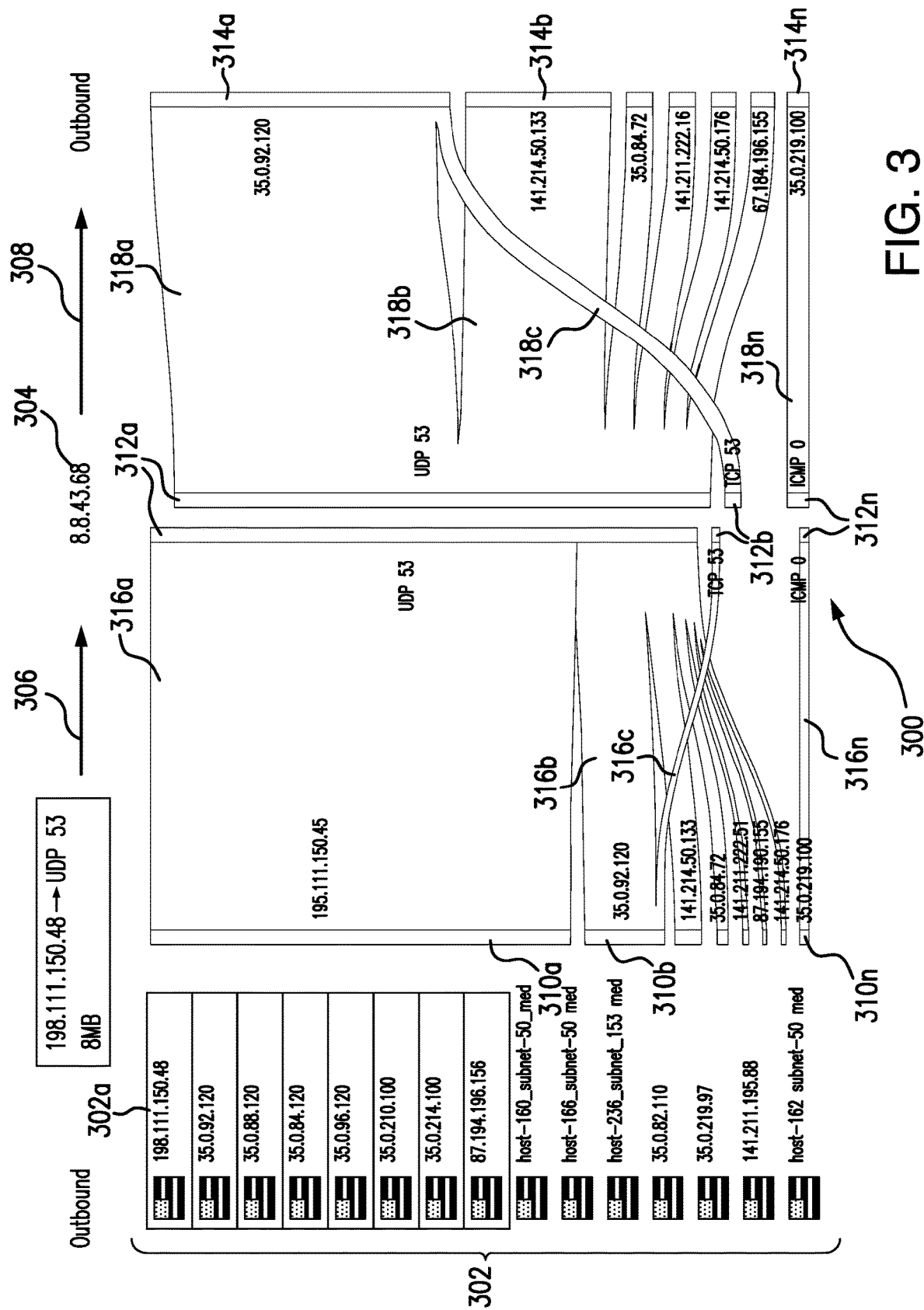
FIG. 3 is a Sankey diagram of traffic flow through a host generated by an embodiment of the present invention.

Furthermore, grouping can be used by the traffic analyzer 156 to aggregate hosts or ports/services that meet certain conditions to provide a higher level of overview in a traffic flow diagram, as will be described below in conjunction with FIG. 3. In one embodiment, the traffic analyzer 156 may aggregate one or more external hosts 106a-106n into groups based on a user-specified aggregation criterion. In other words, the traffic analyzer 156 may collapse traffic flows to the individual hosts into a manageable set of traffic groups' flows. In another embodiment, hosts maybe aggregated based on a pre-defined system criterion. For example, grouped flows could show "Human Resources Traffic," "Building Environmental System Traffic", etc. As another example, nodes in a certain geographic region or a subnet may be assigned a group designation, such as "Traffic to France" or "Bank of China—Chuzhou City China traffic". More specifically, the traffic analyzer 156 may maintain a table having routing paths between other groups, and current links of the nodes within the designated group. As yet another non-limiting example, the traffic analyzer 156 may dynamically analyze the traffic flows and group the links based on other metrics derived to be valuable in order to highlight important characteristics of the traffic for the user. The traffic analyzer 156 can provide more detailed information about traffic connections if users choose to break apart groups of interests by interacting with the traffic flow diagram, as will be described below.

To help network security analysts understand the nature of traffic flowing in and out of the host on a network, the traffic analyzer 156 displays a comprehensive visualization of the traffic as a Sankey diagram on a display device at step 208. Referring now to FIG. 3, there is shown an exemplary Sankey diagram 300 of traffic flow through a host generated by an embodiment of the present invention. As noted above, the present method comprises determining two traffic flows, a first flow 306 carrying data packets from a first plurality of host devices 310a-310n to the specified target node 304 (i.e., target node 160a in FIG. 1), and a second flow 308 carrying data packets from the specified target node 304 to a second plurality of host devices 314a-314n. The first traffic flow 306 representing the network traffic flowing into the identified target node 304 from one or more source nodes 310a-310n is displayed within a first region arranged on the left side of the display device, while the second traffic flow 308 representing the network traffic flowing out of the specified target node 304 to one or more destination nodes 314a-314n is displayed within a second region arranged on the right side of the display device in FIG. 3. It should be noted that both source nodes 310a-310n and destination nodes 314a-314n can represent any of individual physical external host devices 106a-106n and/or any of the protected host devices 160b-160n other than the target node 160a shown in FIG. 1.

Connections (links) 316a-316n between nodes 310a-310n and the target node 304 indicate dependencies between physical hosts represented by nodes 310a-310n and ports or services nodes used to connect to the target node 304. These ports and/or services are represented by nodes 312a-312n in FIG. 3. The combination of all source nodes 310a-310n and port/service nodes 312a-312n graphically represent captured traffic flowing into the target host 304. Similarly, the combination of all port/service nodes 312a-312n connected by links 318a-318n to destination nodes 314a-314n graphically represent captured traffic flowing from the target host 304. In some embodiments, these graphically represented captured traffic flows include only traffic that matches the filtering constraints a user has selected to generate the visualization. The width of connections 316a-316n and 318a-318n in the Sankey diagram illustrated in FIG. 3 are proportional to the quantity included in a corresponding traffic flow. According to an embodiment of the present invention, the traffic analyzer 156 may be configured to update the Sankey diagram 300 in real time as the user adjusts one or more filters, such as to adjust a time period for which data is compiled in generating the traffic flow diagram 300.

As noted above, the number of hosts communicating with the target node 304 could be potentially large. In one embodiment, the traffic analyzer 156 may provide a control area, which may include scrollable listing of all hosts in communication with the target node 304, in a third region 302 depicted in FIG. 3. Furthermore, a subset 302a of all hosts that are currently visible to the user in context of the first 306 and second 308 flows may be highlighted within the control area, as shown in FIG. 3. In one embodiment, the listing of all nodes in communication with the target node 304 within the specified time period may be visible at all times to the user in the control area 302. In one embodiment, the Sankey diagram 300 is designed to work in concert with other visualization elements/components and data displays so that, as new constraints pertaining to relevant network flows are introduced by those components/elements, the Sankey diagram 300 is updated in real time by the traffic analyzer 156 to reflect the introduced/changed constrains.

The traffic flow diagram 300 can be interactive, allowing a user to click on diagram elements (e.g., nodes 310a-310n and 314a-314n, or connections 316a-316n and 318a-318n). Clicking on a particular element can cause more detail to be shown pertaining to traffic flow contributing to the element. In some embodiments, the interaction can indicate a request for data not currently available to the traffic analyzer 156. In these embodiments, the traffic analyzer 156 can communicate with appropriate elements of the protection system 150 to aggregate and analyze the appropriate data, and the Sankey diagram 300 can be appropriately updated by the traffic analyzer 156.

Referring back to FIG. 2, once the traffic diagram 300 is presented on the display device at step 208, the traffic analyzer 156 may periodically check if any additional information was requested by a user in an interactive manner (step 210). If such information was requested (decision block 210, "yes" branch) and is available, the traffic analyzer 156 presents it to the user at step 212 via one or more visualization elements described below in conjunction with FIGS. 4A-4C. If the requested information is not available, the traffic analyzer 156 aggregates and analyzes the appropriate data by communicating with other components of the protection system 150 prior to presenting the requested data to the user.

Figure 4A:
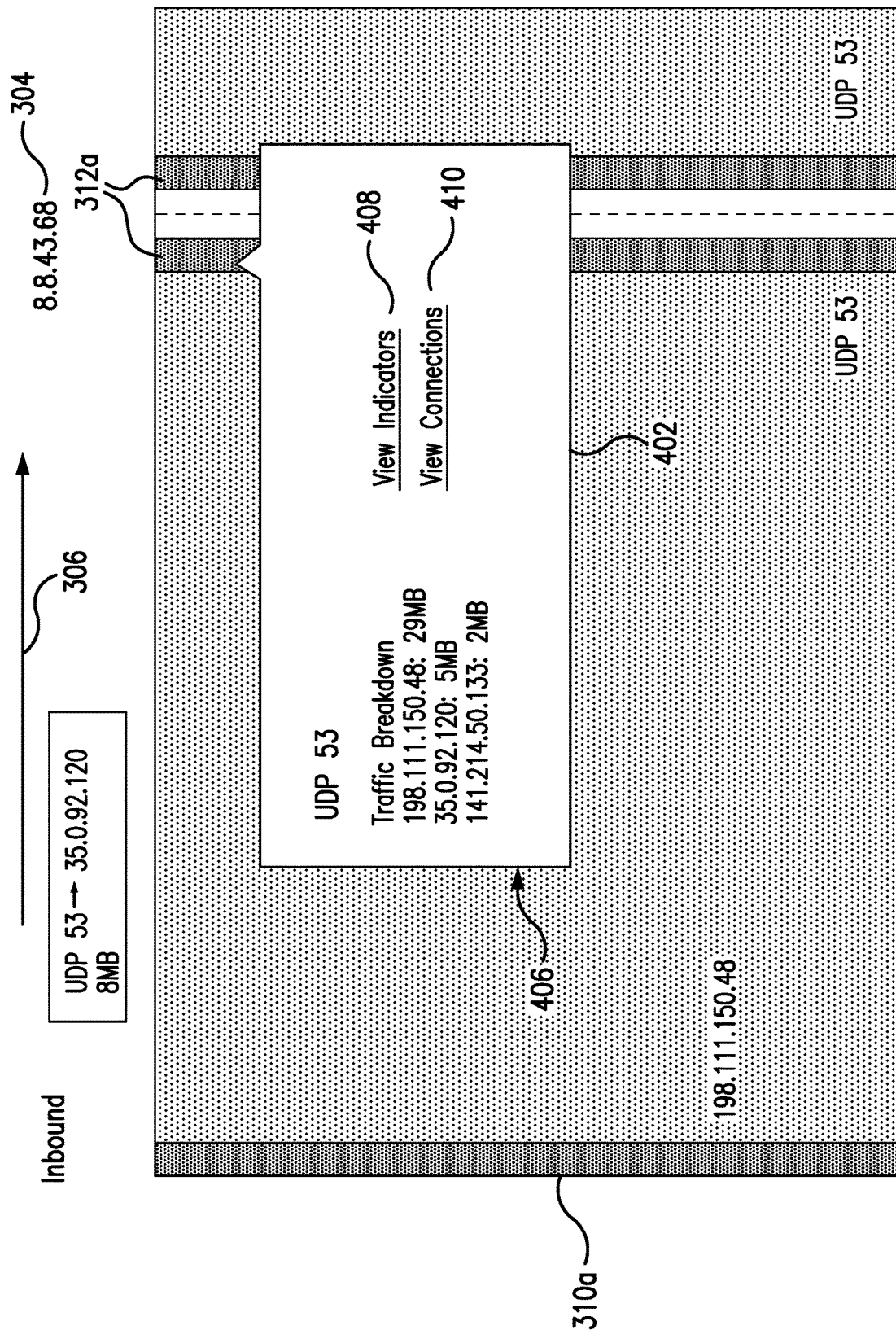
Figure 4B:
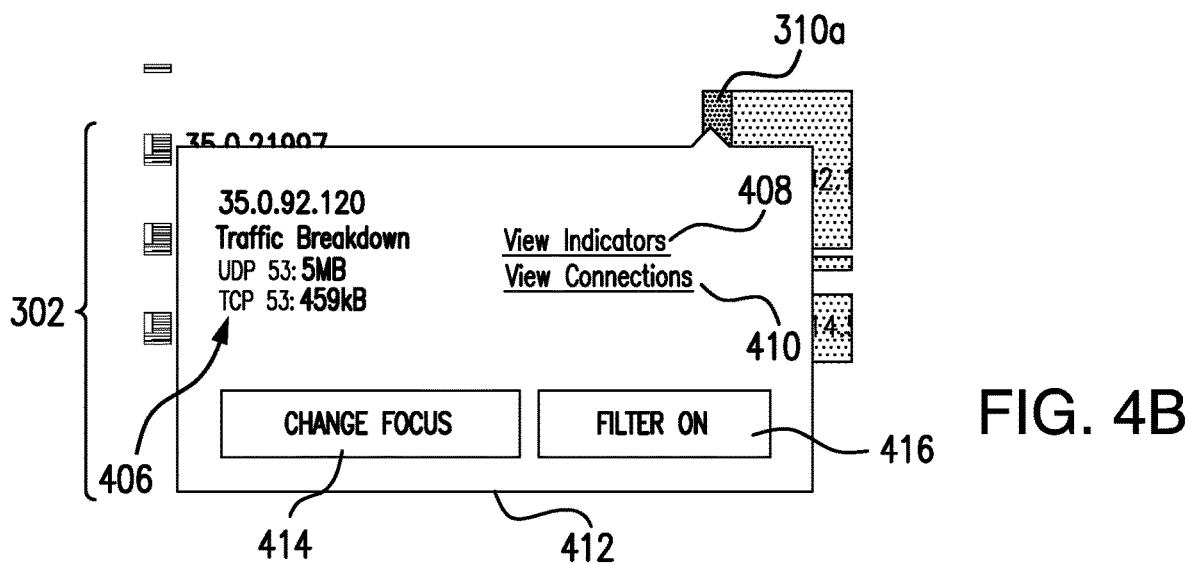
Figure 4C:
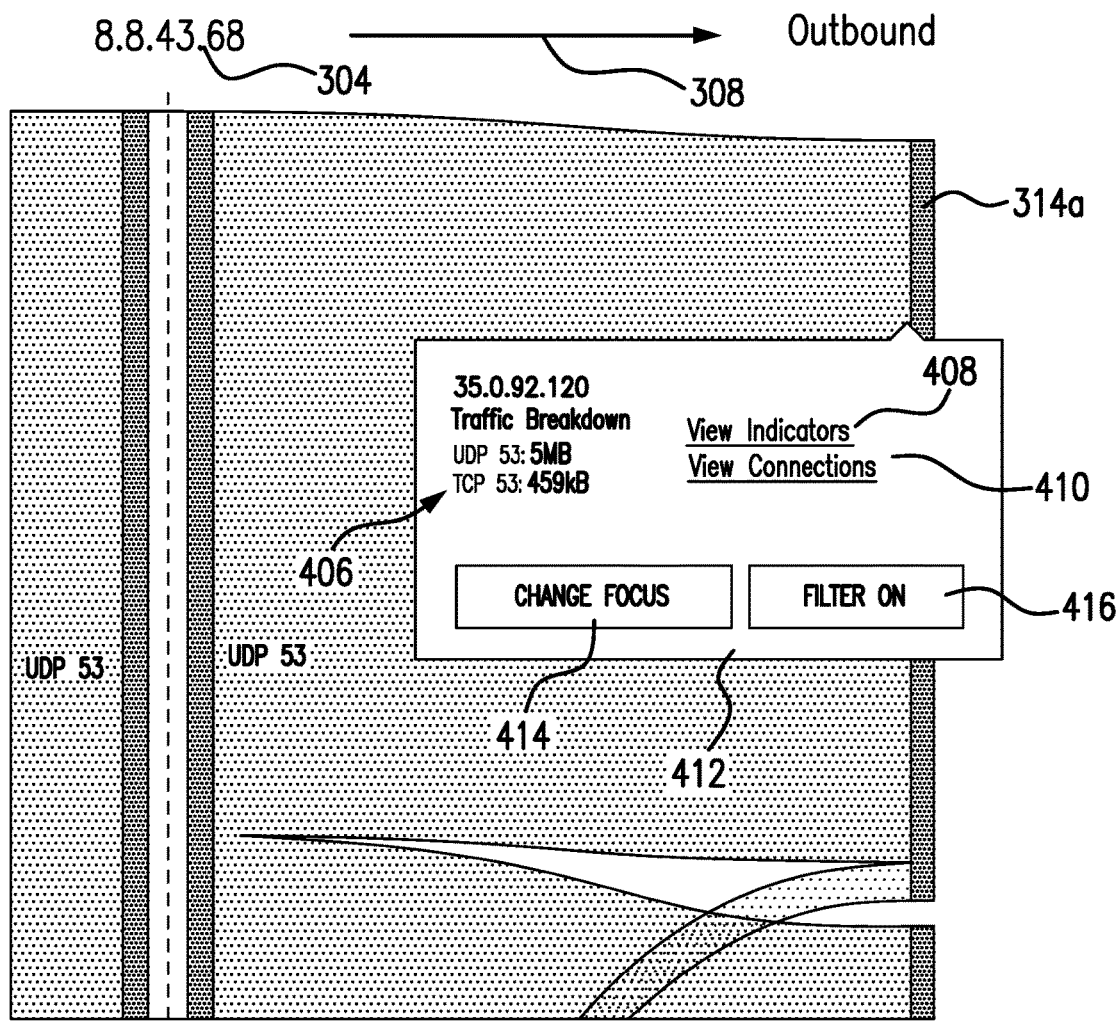

FIGS. 4A-4C illustrate various computer display screens generated by an embodiment of the present invention responsive to interaction with a user. FIG. 4A illustrates that additional information can be requested by user's direct interactions with the nodes 304, 310 and 314 and connections 316 and 318 comprising the traffic flow diagram 300. In the embodiment shown in FIG. 4A, enhanced traffic flow data is presented in a pop-up window 402, which pops up only after user clicks on or hovers a cursor over first service node 312a. As an example, the window 402 presents in, e.g., a left hand portion 406 of the window 402 the breakdown of traffic being sent to the target node 304 via the selected service and port number (e.g., UDP protocol and port number 53), and presents in, e.g., a right hand portion of the window 402 additional links 408 and 410 allowing a user to navigate to further information pertaining to the selected service and port numbers. The window 402 may disappear when, e.g., the cursor is removed from the first service node 312a.

FIGS. 4B and 4C illustrate that filters can also be applied by directly interacting with the nodes and links included in the traffic flow diagram 300. In the embodiment shown in FIG. 4B, enhanced traffic flow data is presented in a pop-up window 412, which pops up after the user clicks on or hovers a cursor over the first source node 310a. In this example, the window 412 presents in, e.g., a left hand portion 406 of the window 412, the breakdown of traffic being sent by the selected source node 310a to the target node 304, and presents in, e.g., a right hand portion of the window 412 additional links 408 and 410 allowing a user to navigate to further information and characteristics pertaining to the selected source node 310a. In the exemplary embodiment shown in FIG. 4B, the popup window 412 includes a "change focus" button 414 and a filter button 416. In response to activating the filter button 416, the user may be provided with a window in which to create an additional filter pertaining to traffic flow between the selected source node 310a and the target node 304. For example, if the source node 310a comprises an aggregation of external hosts 106a-106n, the user may be interested in breaking apart the group and filtering out traffic pertaining to a particular host displayed in the popup window 412. As another non-limiting example, users may apply a filter based on baseline values for the traffic characteristics predetermined based on the set of captured data flows from the set of all hosts.

In addition to helping users (i.e., network security analysts) understand the nature of network traffic and helping to spot anomalies, this interactive approach can allow a user to investigate lateral movement of suspicious traffic within a network that he or she believes to be most concerning. In response to activating the "change focus" button 414, users may be provided with a window in which to designate another node as a target node. Referring back to FIG. 2 yet again, at step 214, the traffic analyzer 156 may periodically determine whether a user selected either an upstream host or a downstream host as a new target node. In response to determining that a new target host or group of hosts was selected by the user (step 214, "yes" branch), the traffic analyzer 156 may repeat analysis of the intercepted communication with respect to the newly selected target node and may present another traffic flow diagram visualizing traffic flow through the newly selected target node (step 216). If detailed traffic analysis of this target node reveals that users' intuition is incorrect, they can easily navigate to other upstream or downstream nodes (e.g., by activating the "change focus" button 414) to investigate any other lateral movement of suspicious traffic within a network.

In one embodiment, the traffic analyzer 156 may provide a secondary, higher level, network flow diagram 300 that visualizes the entire path selected by the user—from the initially selected target host to currently selected target host, optionally normalizing nodes to a selected level of abstraction. This secondary network flow diagram could also allow users recall how they arrived at the current target host and provide an easy way to return to previous points in their investigation path. In other words, this functionality enables users to optionally explore paths from one information element (i.e., host or group) to the next to get a more complete picture of what is happening.

FIG. 4C illustrates that the pop-up window 412 may also appear after the user clicks on or hovers a cursor over the first destination node 314a to investigate characteristics of the traffic flow pertaining to that host. In this embodiment, the enhanced outgoing traffic flow data is presented in the pop-up window 412.

Referring back to FIG. 3, it should be noted that in some interactions with the traffic flow diagram 300, some users might be interested in visually highlighting certain problematic areas. For example, such highlighting may help a user to trace particular host/service combinations into and out of the target host 304. In an embodiment of the present invention, highlighting may also be used by the traffic analyzer 156 to show communication of intercepted critical messages based on the analysis performed at step 206. In yet another embodiment, the traffic analyzer 156 may visually highlight all suspicious host/service communications.

Further, processing of such a large collection of data (for example, as an analyst uses the flow diagram 300 to sift and/or search through huge numbers of data flows to understand how the target host 304 or a group of hosts was attacked during a specified timeframe) may be extremely inefficient and may consume significant time. As noted above some data items (i.e., data communications) may be automatically identified as suspicious by the traffic analyzer 156. Other data communications (flows) may not be automatically identified as suspicious but could be related to identified attack traffic. Generally, flows and/or nodes that have been marked as suspicious warrant more attention and users may want to focus on those data items first. If the dataset analyzed by the traffic analyzer 156 is large (i.e., dataset of intercepted communications corresponding to a specified timeframe), the total number of data communications and/or nodes may be too large to present at once using the traffic flow diagram 300 and needs to be reduced. To this end, users typically need some form of strategy to reduce the number of data flows.

In particular embodiments, navigation among data communication items of a dataset may be accomplished by scrolling. Scrolling may be achieved by any suitable navigation input. Navigation inputs may include input from a peripheral such as a computer mouse, trackball, keyboard, etc. In some scenarios, users may need to scroll through entire dataset (i.e., the list of nodes displayed in the control area 302) or use filtering and/or sorting in order to get to suspicious data communications. In particular embodiments, a "scrubber" (such as scrubber 502 illustrated in FIG. 5B) may be used which corresponds to individual hosts, groups of hosts, or other portions of a dataset.

FIGS. 5A and 5B schematically illustrate operation of scrolling and scrubbing controls that may be employed by the traffic analyzer 156 to present data within the traffic flow diagram 300, according to an embodiment of the present invention. In one embodiment, the traffic analyzer 156 may provide at least one control in the form of a scrollable view bar arranged in the control area 302. FIG. 5A is an example of a control window 500 displayed by the traffic analyzer 156 in the control area 302 of the traffic flow diagram 300. The control window 500 includes a main section 501 and a scroll bar section 503.

The main section 501 of the control window 500 displays at least a portion of data communication items included in the analyzed data set, at least some of which may be requiring attention of the user. Within the main section 501, the traffic analyzer 156 may display a section of the captured data flow corresponding to the specified time period for which investigation is performed so as to provide enough detail and information for the period of appropriate time span to assist the user with his/her tasks. For example, in FIG. 5A, a time period of 2 minutes of all data communications with the specified target host 304 may be included in the control window 500. In some embodiments, each item (i.e., each source node) displayed within the main section 501 can be a hyperlink to more detailed information. In some embodiments, users may click on items of interest in the control window 500 to perform additional dynamic filtering. For example, in response to clicking on a particular source node, users may be provided with a window in which to create an additional filter pertaining to traffic flow between the selected source node and the target node 304 or may be provided with other functionality enabling network security analysts or other users to otherwise analyze one or more aspects of a flow.

The scroll bar section 503 is shown to be arranged parallel to the main section 501 in FIG. 5A. The scroll bar section 503 is a section including a scroll bar track 504 and a scrollbar handle 502. The scroll bar section 503 enables users to navigate through analyzed data set item displayed in the main section 501. In other words, the user can select the section of data set (with corresponding data communication items) to be displayed in the main section 501, by manipulating the scroll bar handle 502 using an input device, such as a keyboard or a mouse (not shown). This aspect of the data flow visualization can be performed by the traffic analyzer 156 based on an operator input to move the scroll bar handle 502.

According to an embodiment of the present invention, the scroll bar section 503 may further include graphical indicators of suspicious data traffic that are displayed within the scrollbar track 504. In one embodiment, these graphical indicators may comprise bars 506 shown in FIGS. 5A and 5B. The suspicious activity alert bars 506 indicate corresponding suspicious data communication items of the main section 501. Users may utilize alert bars 506 to determine how to filter the information presented in the traffic flow diagram 300. It is noted that an entire list of data communication items corresponding to specified criteria may be substantially longer than that displayed in the main section 501.

The alert markers 506 help users to see where suspicious items are located in the entire dataset without any filtering or sorting of data. Also, in some cases, it may be useful to see suspicious data communications together with normal data communication items. Each alert bar (marker) 506 corresponds to one or more data communication items of the subset shown in the main section 501, and position of the alert marker 506 within the scrollbar track 504 is determined in accordance with the position of the corresponding data item in the main section 501. Thus, alert bars 506 provide useful summary information. For example, a user can quickly look at the number of alert markers 506 displayed within the scrollbar track 504 to determine approximately how many suspicious data communication items have been identified in the analyzed dataset. As another non-limiting example, if the data communication items presented in the main section 501 are sorted in descending order on number of bytes transferred, a concentration of alert markers 506 near the bottom of the scrollbar track 504 would indicate that the suspicious communications are associated with smaller size transfers.

In an embodiment of the present invention, the traffic analyzer 156 may employ color-coded alert markers 506. The colors correspond to the severity of the marked suspicious activity. In one exemplary embodiment, the color sequence for a set of alert markers 506 in increasing severity is yellow, orange, and red. The markers, then, in one embodiment, may be considered a form of graduated suspicious activity severity. While FIG. 5A shows only 3 orange alert markers 506*a* and two red (highest severity) alert markers 506*b*, it is to be understood that there could be different number of different colors of markers 506 presented within the scrollbar track 504. In some embodiments, the traffic analyzer 156 may also provide keyboard input, such as a shortcut key, for users to quickly "jump" between suspicious activity markers 506 within the analyzed dataset.

While FIG. 5A shows the control window 500 to have the scroll bar section 503 parallel to the main section 501, it is to be understood that different graphical representation presenting the relevant information can also be implemented without departing from the scope and spirit of the present invention. For example, turning now to FIG. 5B, a control window 500 in accordance with another embodiment of the present invention is illustrated. The control window 500 comprises a scrubber bar 504 and a scrubber handle 502. In this example, users may navigate to the various sections of the analyzed dataset by sliding the scrubber handle 502 across the scrubber bar 504 in either direction. In general, a scrubber may be used to navigate among any suitable UI components in any suitable context. In this case, alert bars 506 corresponding to suspicious activity are displayed within the scrubber bar 504. Further, since in this case the traffic analyzer 156 provides a horizontal arrangement of the control window 500, the alert markers 506 in FIG. 5B may comprise color-coded vertical bars rather than color-coded horizontal bars shown in FIG. 5A.

In summary, conventional network management tools present unusual volumes of traffic as separate lists, but they paint an incomplete picture. To help network security analysts understand the nature of traffic flowing in and out of a particular host on a network, various embodiments of the present invention provide a comprehensive visualization of the traffic as a Sankey diagram. Advantageously, the Sankey diagram graphically shows established relationships between source hosts, ports/services, a target host, and destination hosts, rather than as unrelated lists. The Sankey diagram described above also visually shows the direction of pass-through network traffic through a host device. In addition, various embodiments of the present invention enable users to aggregate certain pieces of information but still be precise enough to call out potential security issues with specific source and/or destination hosts on specific ports/services. As yet another advantage, additional investigative operations may take place in the context of, for example, a particular source or destination host, port/service and the target host. In some embodiments, the Sankey diagram can be used in a similar way for other types of targets in addition to an individual host. For example, the Sankey diagram described above could also show traffic flowing through a group of hosts.

In some embodiments, the ability to mark items in a scrollable control enables improved analysis by helping users to determine suspicious data communications faster and helping them to get a visual sense of some important characteristics in the analyzed network traffic dataset as a whole. The unobtrusively displayed directly actionable information is presented without the user requesting it. While the described methods may still require filtering and sorting operations, the skilled artisan will recognize that the described method of marking suspicious activities may be used to provide valuable initial information. For example, if the number of marked data items is small, users may not even need to perform additional sorting and/or filtering of one or more data communications contained in the analyzed dataset.

With the illustrative embodiments of the invention described above, it is to be appreciated the above presents a description of a best mode contemplated for carrying out the present invention and of the manner and process of making and using it in such full, clear, concise, and exact terms as to enable any person skilled in the art to which it pertains to make and use these devices and methods. The present invention is, however, susceptible to modifications and alternative method steps from those discussed above that are fully equivalent. Consequently, the present invention is not limited to the particular embodiments disclosed. On the contrary, the present invention encompasses all modifications and alternative constructions and methods coming within the spirit and scope of the present invention. The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. A method performed by a computer system having one or more processors and memory storing one or more programs for execution by the one or more processors for handling requests to a protected computer network, the method comprising steps of:
   intercepting data communications occurring between one or more hosts and a preselected target host in the protected computer network, the intercepted data communication comprising a plurality of data packets;
   analyzing the intercepted data communications to determine volumetric incoming traffic flow and to determine volumetric outgoing traffic flow for the received data packets;
   providing a graphical representation on a user display indicating the determined volumetric incoming traffic flow for the received data packets by a first region and graphically representing the determined volumetric outgoing traffic flow for the received data packets by a second region, the graphical representation comprising a plurality of nodes interconnected by a plurality of links, the plurality of nodes representing the one or more hosts and the plurality of links indicating operational relationship between the preselected target host, the one or more hosts, communication ports and communication services used in the data communications and wherein selection of an individual link by a user provides a popup window indicating traffic information associated with the user selected link; and
   providing on the user display additional information in a popup window responsive to a user's interaction with a cursor on the user display whereby when the user positions the cursor over one of the plurality of nodes ("user selected node") a first section of the popup window illustrates traffic being sent to the user selected node wherein a second section of the popup window includes: 1) a filter button which when selected by the user is configured to provide additional user prescribed filtering for traffic flow to the user selected node; and 2) a focus button which when selected by the user causes a change in the selected node subject to analysis.

2. The method as recited in claim 1, wherein the first region is arranged on the left side of a display device and the second region is arranged on the right side of a display device.

3. The method as recited in claim 1, wherein the step of analyzing the intercepted data communications further comprises filtering out data communications based on a previously generated first filter having at least one traffic setting.

4. The method as recited in claim 3, further comprising the step of a user prescribing a second filter by interacting with the plurality of nodes and/or the plurality of links included in the graphical representation.

5. The method as recited in claim 1, further comprising the step of enabling a user to highlight suspicious data communications in the graphical representation.

6. The method as recited in claim 1, wherein the step of graphically representing the determined incoming volumetric traffic flow and graphically representing the determined volumetric outgoing traffic flow further comprises the step of aggregating the one or more hosts into groups based on a user-specified aggregation criterion and wherein each of the plurality of nodes in the graphical representation represents one of the aggregated groups.

7. The method as recited in claim 1, further comprising the step of providing a control in the form of a scrollable view bar arranged in a control area of the graphical representation, the scrollable view bar having manipulable handle and a view window configured for visually indicating a portion of the determined incoming or outgoing volumetric traffic flow in the graphical representation.

8. The method as recited in claim 7, wherein the scrollable view bar enables a user to indicate suspicious data communications in the graphical representation using color coded graphical indicators arranged within the scrollable view bar.

9. The method as recited in claim 7, wherein the scrollable view bar enables a user to prescribe a second filter by interacting with the scrollable view bar.

10. A system for analyzing network traffic based upon user selected values, comprising:
a memory;
a processor disposed in communication with said memory, and configured to issue a plurality of instructions stored in the memory, wherein the instructions issue signals to:
intercept data communications occurring between one or more hosts and a preselected target host in the protected computer network, the intercepted data communication comprising a plurality of data packets;
analyze the intercepted data communications to determine volumetric incoming traffic flow and to determine volumetric outgoing traffic flow for the received data packets;
provide a graphical representation on a user display the determined volumetric incoming traffic flow for the received data packets by a first region and graphically representing the determined volumetric outgoing traffic flow for the received data packets by a second region, the graphical representation comprising a plurality of nodes interconnected by a plurality of links, the plurality of nodes representing the one or more hosts and the plurality of links indicating operational relationship between the preselected target host, the one or more hosts, communication ports and communication services used in the data communications and wherein selection of an individual link by a user provides a popup window indicating traffic information associated with the user selected link; and
provide a control in the form of a scrollable view bar arranged in a control area of the graphical representation, the scrollable view bar having manipulable handle and a view window configured for visually indicating a portion of the determined incoming or outgoing volumetric traffic flow in the graphical representation; and
provide on the user display additional information in a popup window responsive to a user's interaction with a cursor on the user display whereby when the user positions the cursor over one of the plurality of nodes ("user selected node") a first section of the popup window illustrates traffic being sent to the user selected node wherein a second section of the popup window includes: 1) a filter button which when selected by the user is configured to provide additional user prescribed filtering for traffic flow to the user selected node; and 2) a focus button which when selected by the user causes a change in the selected node subject to analysis.

11. The system as recited in claim 10, wherein the first region is arranged on the left side of a display device and the second region is arranged on the right side of a display device.

12. The system as recited in claim 10, wherein analyzing the intercepted data communications further comprises filtering out data communications based on a previously generated first filter having at least one traffic setting.

13. The system as recited in claim 12, wherein a user prescribes a second filter by interacting with the plurality of nodes and/or the plurality of links included in the graphical representation.

14. The system as recited in claim 10, wherein graphically representing the determined incoming volumetric traffic flow and graphically representing the determined volumetric outgoing traffic flow further comprises aggregating the one or more hosts into groups based on a user-specified aggregation criterion and wherein each of the plurality of nodes in the graphical representation represents one of the aggregated groups.

15. The system as recited in claim 10, wherein the scrollable view bar enables a user to indicate suspicious data communications in the graphical representation using color coded graphical indicators arranged within the scrollable view bar.

16. A non-transitory computer readable storage medium and one or more computer programs embedded therein, the computer programs comprising instructions, which when executed by a computer system, cause the computer system to:
intercept data communications occurring between one or more hosts and a preselected target host in the protected computer network, the intercepted data communication comprising a plurality of data packets;
analyze the intercepted data communications to determine volumetric incoming traffic flow and to determine volumetric outgoing traffic flow for the received data packets; and
provide a graphical representation on a user display the determined volumetric incoming traffic flow for the received data packets by a first region and graphically representing the determined volumetric outgoing traffic flow for the received data packets by a second region, the graphical representation comprising a plurality of nodes interconnected by a plurality of links, the plurality of nodes representing the one or more hosts and the plurality of links indicating operational relationship between the preselected target host, the one or more hosts, communication ports and communication services used in the data communications and wherein selection of an individual link by a user provides a popup window indicating traffic information associated with the user selected link; and
provide on the user display additional information in a popup window responsive to a user's interaction with a cursor on the user display whereby when the user positions the cursor over one of the plurality of nodes ("user selected node") a first section of the popup window illustrates traffic being sent to the user selected node wherein a second section of the popup window includes: 1) a filter button which when selected by the user is configured to provide additional user prescribed filtering for traffic flow to the user selected node; and 2)

a focus button which when selected by the user causes a change in the selected node subject to analysis.

17. The non-transitory computer readable storage medium as recited in claim 16, wherein analyzing the intercepted data communications further comprises filtering out data communications based on a previously generated first filter having at least one traffic setting.

18. The non-transitory computer readable storage medium as recited in claim 16, wherein graphically representing the determined incoming volumetric traffic flow and graphically representing the determined volumetric outgoing traffic flow further comprises aggregating the one or more hosts into groups based on a user-specified aggregation criterion or based on a pre-defined system criterion and wherein each of the plurality of nodes in the graphical representation represents one of the aggregated groups.

* * * * *